United States Patent [19]

Roberts et al.

[11] 4,158,346
[45] Jun. 19, 1979

[54] ENGINE EFFICIENCY UNIT

[75] Inventors: Charles G. Roberts, Pontiac; Ernest DeMichele, Farmington Hills, both of Mich.

[73] Assignee: Mectronic, Inc., Detroit, Mich.

[21] Appl. No.: 867,920

[22] Filed: Jan. 9, 1978

Related U.S. Application Data

[63] Continuation-in-part of Ser. No. 604,792, Aug. 14, 1975, Pat. No. 4,074,670.

[51] Int. Cl.² .......................... F02N 7/00; F02B 77/00
[52] U.S. Cl. ................................. 123/1 R; 123/119 E; 123/195 R; 123/195 A; 123/198 R; 123/3
[58] Field of Search ............... 123/1 R, 119 E, 195 R, 123/195 A, 198 R, 3

[56] References Cited

U.S. PATENT DOCUMENTS

| 4,005,683 | 2/1977 | Whitt | 123/3 |
| 4,043,308 | 8/1977 | Cerkanowicz | 123/119 E |
| 4,050,426 | 9/1977 | Sanderson | 123/119 E |
| 4,064,852 | 12/1977 | Fulenwider | 123/119 E |
| 4,074,670 | 2/1978 | Roberts et al. | 123/119 E |
| 4,091,779 | 5/1978 | Saufferer et al. | 123/119 E |

Primary Examiner—Wendell E. Burns
Attorney, Agent, or Firm—Gifford, Chandler, VanOphem, Sheridan & Sprinkle

[57] ABSTRACT

A pair of closely adjacent electrically conductive coils, suitably encapsulated, are secured to or retained closely adjacent the positive terminal of a battery of an internal combustion engine. An electrical wire extends from the coils and is electrically connected to the negative terminal of the battery.

13 Claims, 8 Drawing Figures

ENGINE EFFICIENCY UNIT

CROSS-REFERENCE TO RELATED APPLICATIONS

The present application is a continuation-in-part of the U.S. Pat. application Ser. No. 604,792, filed Aug. 14, 1975, and now U.S. Pat. No. 4,074,670 issued on Feb. 21, 1978.

BACKGROUND OF THE INVENTION

I. Field of the Invention

The present invention relates to a device connected to a battery of an internal combustion engine to improve the efficiency of the engine.

II. Description of the Prior Art

To our knowledge no attempt has heretofore been made to provide a device coupled to a battery for an engine which utilizes magnetic fields to produce ion transfer and increase the efficiency of the engine.

SUMMARY OF THE INVENTION

The present invention comprises a pair of closely adjacent, preferably oppositely wound, electrically conductive coils which are encapsulated in a suitable insulating material and form an efficiency unit. The coils have their ends connected to each other and are preferably wound about an iron core such that the number of windings on one coil is three times the number of windings on the other coil.

The encapsulated efficiency unit is positioned closely adjacent the positive pole of the battery for the engine while an electrical wire extends from the encapsulated coils at one end and is electrically connected to the negative terminal of the battery at its other end. The first mentioned end of the wire is preferably electrically connected to the coils, either directly, or indirectly by connection with the iron core.

The precise mode of operation and the underlying scientific principles upon which the device of the present invention operates are unclear and not entirely understood at this time. One theory, however, is that the efficiency unit reacts to magnetic fields surrounding it to generate a beneficial ion transfer. This ion transfer, for reasons unknown at this time, increases the efficiency of the internal combustion engine to which the battery is connected.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PRESENT INVENTION

Figure 1:
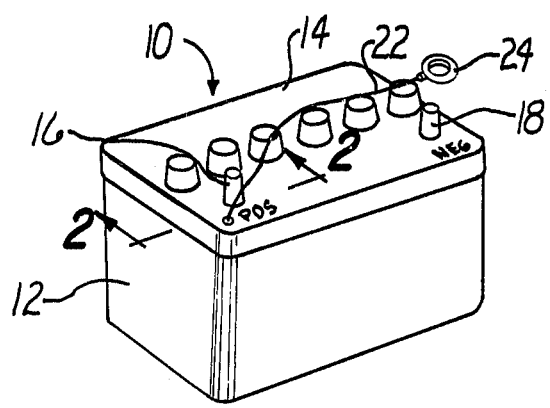
FIG. 1 is a perspective view showing the efficiency unit of the present invention coupled to a battery.
Figure 2:
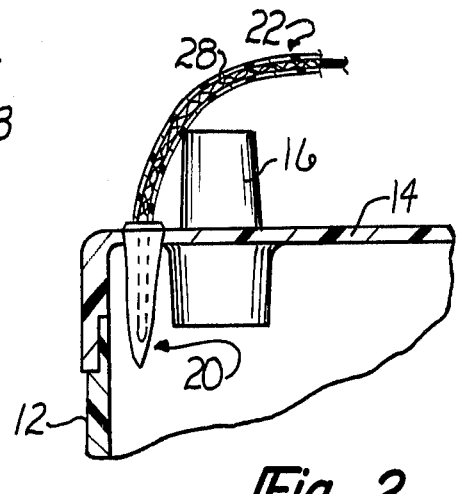
FIG. 2 is a fragmentary sectional view illustrating the efficiency unit of the present invention installed in the battery.

With reference first to FIGS. 1 and 2, a battery 10 is thereshown of the type employed with an internal combustion engine 11 (FIG. 4) for automobiles and similar vehicles. As is conventional with such batteries, the battery 10 includes a housing 12 covered across its top by a lid 14. A positive pole 16 and a negative pole 18 extend outwardly and upwardly from the lid 14 for connection with the electrical system for the engine. Alternatively, however, the terminal 16 and 18 can be positioned on any portion of the battery 10.

An efficiency unit 20 according to the present invention and which will subsequently be described in greater detail is installed in the battery lid 14 closely adjacent the positive terminal 16. An electrically conductive wire 22 preferably made of iron extends outwardly from the efficiency unit and is electrically connected with the negative battery terminal 18 by suitable connector means 24. The wire 22 includes an electrically insulating casing 28 and the unit 20 itself is electrically insulated from the positive terminal 16 as will be shortly more fully described.

Figure 3:
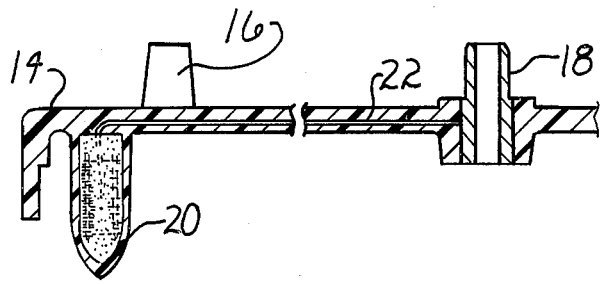
FIG. 3 is a fragmentary sectional view similar to FIG. 2 but showing a modification thereof.

Although the wire 22 from the efficiency unit 20 is shown extending exteriorly of the battery lid 14 in FIGS. 1 and 2, the wire 22 alternatively can be molded directly within the battery lid 14 along with the efficiency unit 20 as best shown in FIG. 3. FIG. 3 depicts the preferred mode of construction when the efficiency unit 20 is connected to the battery lid 14 at the time of manufacture of the battery lid 14. Conversely, FIGS. 1 and 2 depict the preferred form of the invention when the efficiency unit 20 is installed within the battery 10 subsequent to the manufacture of the battery 10.

Figure 5:
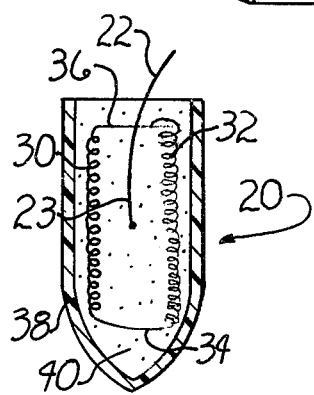
FIG. 5 is a cross-sectional view illustrating a preferred form of the efficiency unit of the present invention and enlarged for clarity.

FIG. 5 illustrates the efficiency unit 20 in greater detail as including a pair of spaced but closely adjacent electrically conductive coils 30 and 32 disposed about substantially parallel axes and preferably wound in opposite directions. The coils 30 and 32 may include any number of fine wire windings but it is preferred that the number of windings of one coil be approximately three times the number of windings of the other coil. For example, the coil 32 may have ninety windings while the coil 30 has thirty windings.

Still referring to FIG. 5, the ends of the coils 30 and 32 are electrically connected together by leads 34 and 36. The coils 30 and 32 in turn are contained within an insulating body 38 which is filled with a suitable electrically insulating encapsulating material 40. As shown in FIG. 5, one end 23 of the wire 22 is disposed closely adjacent to, but is not electrically connected with, both of the coils 30 and 32.

Figure 6:
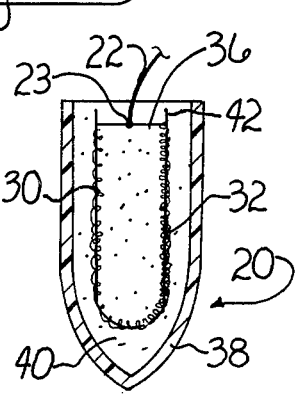
FIG. 6 is a sectional view similar to FIG. 5 but showing a modification thereof.

With reference now to FIG. 6, a modification of the efficiency unit is thereshown similar to that shown in FIG. 5 except that the coils 30 and 32 are wound about opposite legs of a U-shaped iron core 42. In addition, the end 23 of the wire 22 is directly electrically connected to the coils 30 and 32 by connection with the lead 36.

Figure 7:
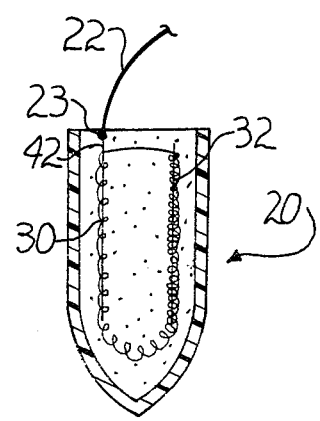
FIG. 7 is a sectional view similar to both FIGS. 5 and 6 but showing a still further modification thereof.

With reference now to FIG. 7, a still further modification of the efficiency unit 20 is thereshown which is similar to the unit 20 shown in FIG. 6. In FIG. 7, however, the end 23 of the lead 22 is indirectly electrically connected with the coils 30 and 32 by connection with one end of the iron core 42.

Figure 4:
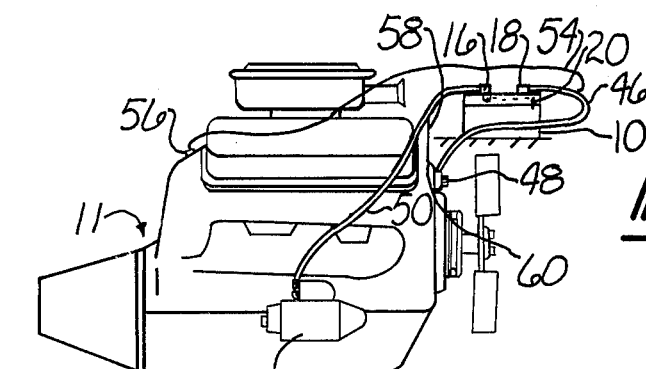
FIG. 4 is a partial diagrammatic view showing the battery coupled to an internal combustion engine and illustrating a still further improvement thereof.

With reference now to FIG. 4, the battery 10 containing the efficiency unit 20 is electrically connected to the internal combustion engine 11 of the type used in automobiles and similar vehicles. As is conventional, battery cable 46 is connected between the negative battery terminal 18 and the engine housing at 48. Similarly, a second battery cable 50 is connected between the positive battery terminal 16 and the engine starting motor 52.

Still referring to FIG. 4, a still further engine efficiency improvement can be achieved by branching an iron wire 54 from the negative battery cable 46 and connecting the other end of the wire 54 to the rear of the engine 11. The wire 54, however, is covered or coated with a suitable electrical insulating material so that the wire 54 is electrically insulated from the battery cable 46 although at least a portion of the wire 54 lies closely adjacent the wires in the battery cable 46. Similarly, a second wire 58 branches outwardly from the positive battery cable 50 and is connected at 60 to the front of the internal combustion engine 11. The wire 58, like the wire 54, is electrically insulated from the battery cable 50 although at least a portion thereof is closely adjacent the wires within the battery cable 50.

Figure 8:
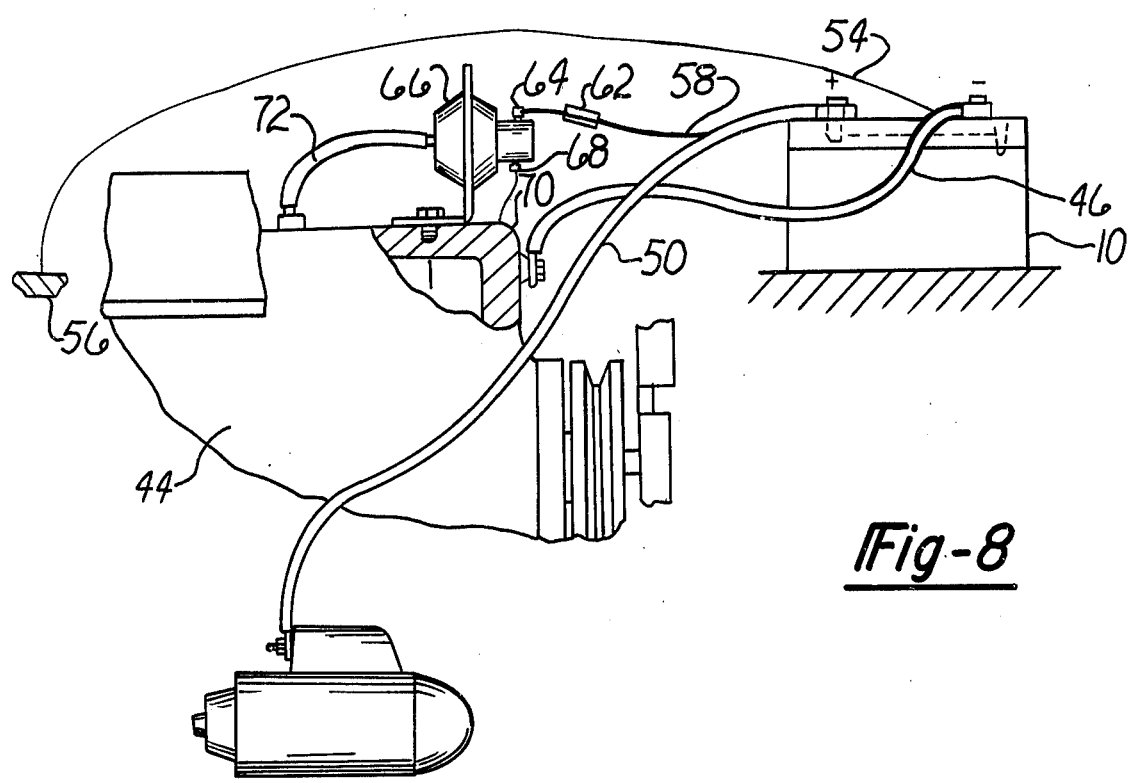
FIG. 8 is a diagrammatic view similar to FIG. 4 but showing a modification thereof.

FIG. 8 is similar to FIG. 4 except that the wires 54 and 58 branch out from and are electrically connected with their respective battery cables 46 and 50. However, to prevent battery drain when the engine 11 is not running, the wire 58 is coupled through a resistor 62 to one lead 64 of a diaphragm switch 66. The second lead 68 of the switch is connected at 70 to the front of the engine. The diaphragm switch 66 is a normally open switch and is activated or closed by the engine manifold vacuum via a tube 72. Thus, when the engine 44 is started, the manifold vacuum closes the switch 66 and completes the electrical circuit between the switch terminals 64 and 68.

As previously set forth, the precise mode of operation and the underlying scientific principles for the efficiency device 20 of the present invention are not entirely understood at this time. However, tests have shown that the efficiency unit 20 increases engine efficiency and consequently, increases the miles per gallon obtainable by the internal combustion engine for given speed and load conditions.

Having described our invention, however, many modifications thereto will become apparent to those skilled in the art to which it pertains without deviation from the spirit of the invention as defined by the scope of the appended claims.

We claim:

1. In combination with an internal combustion engine having an electrical system and a battery having a negative and a positive terminal connected to the engine electrical system, an energy efficiency device comprising:
   a pair of closely adjacent electrically conductive coils disposed on substantially parallel axes;
   means for mounting said coils adjacent one terminal of the battery; and
   a wire having one end adjacent said coils and its other end electrically connected to the other battery terminal.

2. The invention as defined in claim 1 wherein the ends of the coils are connected together.

3. The invention as defined in claim 1 and including an iron core disposed through each coil.

4. The invention as defined in claim 1 wherein one coil has substantially three times as many windings as the other coil.

5. The invention as defined in claim 2 wherein said wire is electrically connected to at least one coil.

6. The invention as defined in claim 3 wherein said wire is connected to at least one iron core.

7. The invention as defined in claim 6 wherein said core is U-shaped with one coil being wound about each free leg of the U-shaped core.

8. The invention as defined in claim 1 wherein said coils are encapsulated in an electrically insulating material.

9. The invention as defined in claim 1 wherein said battery has a housing and wherein said wire is molded into said housing.

10. The invention as defined in claim 1 wherein each battery terminal is connected to the engine electrical system via a battery cable, said device further comprising a first iron wire extending outwardly from the positive terminal battery cable and secured at its free end to the front of the engine and a second iron wire extending outwardly from the negative terminal battery cable and connected to the rear of the engine, said iron wires being electrically insulated from the battery cables.

11. The invention as defined in claim 1 wherein each battery terminal is connected to the engine electrical system via a battery cable, said device further comprising a first iron wire extending outwardly from the negative terminal battery cable and connected at its free end to the rear of the engine and a second iron wire extending outwardly from the positive terminal battery cable and connected at its free end to one terminal of a switch means, the other terminal of the switch being electrically connected to the front of the engine.

12. The invention as defined in claim 11 wherein said switch means is a normally open manifold vacuum actuated switch.

13. The invention as defined in claim 1 wherein said wire is made of iron.

* * * * *